United States Patent
Henskes et al.

(10) Patent No.: US 10,660,325 B2
(45) Date of Patent: *May 26, 2020

(54) APPARATUS AND METHOD FOR DETERRING BIRDS BY LASER

(71) Applicant: Steinar Holding B.V., Delft (NL)

(72) Inventors: Steinar Finn Boye Henskes, Delft (NL); Pim Roelof Clement Tammes, Delft (NL); Tim Sprang, Delft (NL)

(73) Assignee: Steinar Holding B.V., Delft (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,266

(22) Filed: Feb. 15, 2019

(65) Prior Publication Data

US 2019/0183109 A1    Jun. 20, 2019

Related U.S. Application Data

(63) Continuation of application No. 14/940,238, filed as application No. PCT/NL2014/050306 on May 15, 2014, now Pat. No. 10,238,100.

(30) Foreign Application Priority Data

May 15, 2013    (NL) ...................................... 2010805

(51) Int. Cl.
    *A01M 29/10*    (2011.01)
(52) U.S. Cl.
    CPC .................... *A01M 29/10* (2013.01)
(58) Field of Classification Search
    CPC ........ A01K 31/00; A01K 31/06; A01K 31/14; A01K 31/18; A01K 31/22; A01K 39/04;
    (Continued)

(56) References Cited

U.S. PATENT DOCUMENTS 7,506,815 B2    3/2009    Spiegel
8,598,998 B2    12/2013    Vassilev et al.
(Continued)

FOREIGN PATENT DOCUMENTS

CN    102165943 A    8/2011
FR    2619674 A1    3/1989
(Continued)

OTHER PUBLICATIONS

International Patent Application No. PCT/NL2014/050306: Written Opinion dated Apr. 17, 2015, 6 pages.
(Continued)

*Primary Examiner* — Daniel Previl
(74) *Attorney, Agent, or Firm* — BakerHostetler

(57) ABSTRACT

The invention concerns an apparatus and a method for deterring birds, comprising a frame fixedly disposed on a structure; a laser light generator connected with the frame, including a laser light source for generating a laser light beam; a supply circuit for supplying the laser light source; driving means connected with the laser light generator, for having at least a part of the laser light generator move; and a control element for controlling the laser light source and the drivable part of the laser light generator, wherein the driving means are arranged for causing a movement to be executed of at least a drivable part of the laser light generator. Thus, an apparatus and a method are obtained having a greater effect in deterring birds.

15 Claims, 3 Drawing Sheets

Figure 1:
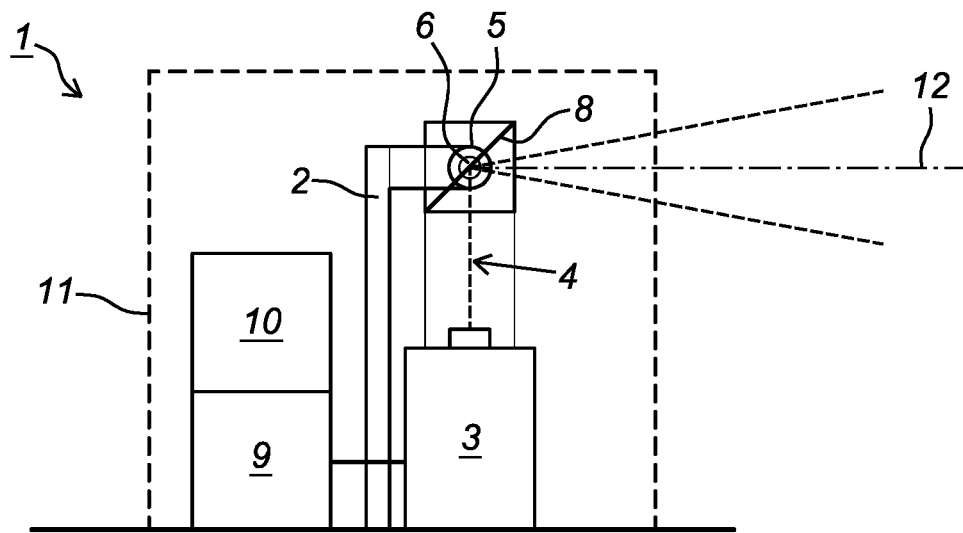

(58) Field of Classification Search
CPC ....... A01M 29/10; A01M 1/04; Y02P 60/521;
A01G 9/022; A61L 2/10; A61N
2005/0644; A61N 2005/0651; A61N 5/06;
A61N 5/0613; A61N 5/0624; B01F
13/0049; B01F 2003/04134; B01F
2003/0417; B01F 2003/0429; B01F
2003/04319; B01F 2003/04361; B01F
3/0412; B60Q 1/06; B64C 2201/027;
B64C 2201/042; B64C 2201/044; B64C
2201/108; B64C 2201/146; B64C
2201/148; B64C 27/10; B64C 39/022;
B64C 39/024; C02F 1/325; C02F
2201/3222; E02B 1/003; G02B 27/288;
G03B 15/03; G05D 1/102; G10K 15/08;
H04S 2400/11; H04S 7/30; H04S 7/302;
H04S 7/305; Y02W 10/37
USPC .......... 340/573.2, 541, 552, 555–557, 568.1,
340/572.1, 5.1, 5.8, 545.3, 551, 578, 641
See application file for complete search history.

(56) References Cited

U.S. PATENT DOCUMENTS

| | | | |
|---|---|---|---|
| 8,859,914 B1 | 10/2014 | Huang | |
| 9,295,245 B1 | 3/2016 | Guice et al. | |
| 9,474,265 B2 | 10/2016 | Duncan et al. | |
| 10,238,100 B2* | 3/2019 | Henskes | ............ A01M 29/10 |
| 2002/0074559 A1* | 6/2002 | Dowling | ................. A61N 5/06 |
| | | | 257/99 |
| 2002/0130770 A1* | 9/2002 | Keyworth | ............... G01S 7/521 |
| | | | 340/436 |
| 2003/0042342 A1 | 3/2003 | Kroger et al. | |
| 2003/0193805 A1* | 10/2003 | Matheson | ............. A01M 29/10 |
| | | | 362/276 |
| 2008/0210153 A1 | 9/2008 | Alvarado | |
| 2012/0113754 A1 | 5/2012 | Husseiny et al. | |
| 2013/0025544 A1* | 1/2013 | Arman | .................. A01M 29/10 |
| | | | 119/712 |
| 2013/0180466 A1* | 7/2013 | Brown | .................. A01M 29/10 |
| | | | 119/713 |
| 2013/0249218 A1* | 9/2013 | Vassilev | .................. F03D 80/10 |
| | | | 290/55 |
| 2015/0010399 A1* | 1/2015 | Bahat | .................... A01M 29/08 |
| | | | 416/1 |

FOREIGN PATENT DOCUMENTS

WO WO 2005/067378 A2 7/2005
WO WO 2009/010961 A2 1/2009

OTHER PUBLICATIONS

International Patent Application No. PCT/NL2014/050306: International Preliminary Report on Patentability dated Aug. 27, 2015, 17 pages.
International Patent Application No. PCT/NL2014/050306: International Search Report dated Sep. 4, 2014, 2 pages.

* cited by examiner

APPARATUS AND METHOD FOR DETERRING BIRDS BY LASER

This application is a continuation application of U.S. patent application Ser. No. 14/940,238, filed Nov. 13, 2015, which is a national stage of international patent application no. PCT/NL2014/050306, filed May 15, 2014, which claims priority to Netherlands patent application no. 2010805, filed May 15, 2013, the teachings of all of which are hereby incorporated by reference as if set forth in their entirety herein.

The present invention concerns the deterring of birds. Birds can cause nuisance problems, in particular at airports for airplanes and helicopters, but also in orchards, where the birds typically consume the fruit.

According to the prior art, an apparatus for deterring birds is known which is provided with a fixedly disposed frame, a laser light generator connected with the frame, including a laser light source for generating a laser light beam, a supply circuit for supplying the laser light source, driving means connected with the laser light generator, for having at least a part of the laser light generator move, and a control element for controlling the laser light source and the drivable part of the laser light generator.

This known apparatus upon activation generates a laser beam, which is to deter the birds. As the apparatus is fixedly disposed, the laser beam will be stationary and the deterrent effect is low, in particular as the birds habituate to the presence of the laser beam.

The object of the invention is to provide such an apparatus, whose deterrent effect is greater.

This object is achieved in that the driving means are arranged for causing a repetitive movement to be executed of at least a drivable part of the laser light generator. These measures thus cause a moving laser beam, which has a much greater dissuasive and deterrent effect than a stationary beam. It is noted that the birds see the laser beam as a physical object and are thereby deterred faster.

The invention also concerns a method for deterring birds, which comprises generating in a fixedly disposed apparatus a bird deterrent laser beam, wherein the laser light beam performs a repetitive movement.

According to a first embodiment, the drivable part of the laser light generator is arranged for causing the laser light beam to move in a single direction. This embodiment has the advantage of a simple construction.

According to another embodiment, the drivable part of the laser light generator is arranged for causing the laser light beam to move in a second direction. With this, more variation in the pattern is obtained, so that habituation of the birds will occur less rapidly.

It is possible, in principle, to have the laser light source move, in particular when the laser light source has a simple construction. When quick, high-frequency movements are to be performed, however, it is preferred that the laser light generator comprises a deflecting device connected after the laser light source, provided with mirrors; that the laser light source is fixedly connected with the frame, and that the driving means are arranged for driving the deflecting device. This configuration can be used not only with the laser beam movable in a single direction, requiring only a single movable mirror, but also with a laser beam movable in two directions, requiring two movable mirrors or other deflecting elements.

As the apparatus according to the invention attempts to deter birds, it is important that the birds actually see the deterrent laser beam or the light spot generated thereby. In particular with air traffic, the laser beam hindering pilots or other persons should be prevented. To this end, it is preferred that the laser light source is arranged for generating laser light having a wavelength of between 300 nm and 400 nm. The invention also concerns a method, whereby laser light having a wavelength of between 300 nm and 400 nm is generated. It is noted incidentally that it is also possible to work with light visible to people, in particular green light.

While a single laser beam may scare away the birds, the area where the birds are in fact scared away by the laser beam is small. Accordingly, there is a need for a phenomenon that occupies a larger volume, so that the deterrent effect extends over a larger area. This object is achieved in that the control element is arranged for causing the laser beam to move with such a high frequency that a bird perceives the moving laser beam as a surface. The surface then apparently occupies a considerably larger volume than the stationary laser beam, so that the deterrent effect is greater. This embodiment also concerns a method, whereby the laser beam is moved with such a high frequency that a bird perceives the moving laser beam as a surface.

Aiming the laser beam at the ground causes a light spot, which, in particular when it moves towards the birds, deters the birds. The laser beam per se, when it has sufficient power, and the environment is sufficiently dark, is also visible to birds. To be able to utilize both effects, it is attractive when the apparatus is arranged for aiming the laser beam both at fixed structures and into the air.

When the apparatus is placed on a moving structure, such as a ship, the danger exists of the laser beam radiating to above the horizon, which is undesirable. To prevent this, for such a situation, the apparatus is provided with means for limiting the angle of elevation of the exiting laser beam. Also, it is possible, in combination with the above feature or without this feature, to dynamically adjust the angle of elevation and the direction to the movements of the structure.

To enhance the repellent effect of the laser beam, it is preferred that the apparatus is arranged for causing the laser beam to move jerkily.

To protect structures such as wind turbines or drilling rigs from birds, the apparatus, according to a preferred embodiment, is arranged for causing a figure to be described which forms the envelope of a structure.

After the birds have been deterred by the apparatus according to the invention, they typically return to the position they have been deterred from, in particular when these positions are attractive to the birds, for instance because of the presence of edible crops. To deter the birds again upon their return, a preferred embodiment proposes that the control element is arranged for causing a program to be executed repeatedly by the laser beam. It is then possible that the program is executed at regular intervals, but also that the frequency is irregular. Also, it is possible that the program is repeated only at twilight and in darkness.

Because of the simple design, it is attractive when the control element is arranged for each time executing the same program.

It is also possible, however, that the control element is arranged for each time executing a different program. The deterrent effect is then greater as the birds are surprised by the pattern changing each time, since habituation by the birds will hardly occur. In that case, the control element has to be arranged for controlling the different patterns.

In particular when the apparatus works autonomously, that is, without detection or prediction of birds, it is attractive when the control element is arranged for executing a program at predetermined points of time. These points of time may be determined with varying intervals, as, for instance, determined by a random generator, but it is also possible that the program is executed at fixed points of time or with fixed intervals. It is incidentally noted that it is also possible to take the influence of the light into account in determining the points of time at which the program is executed and in the choice of the program.

According to a preferred embodiment, the control element is provided with input means and the input means are arranged for inputting the properties of the path to be described by the laser. The term properties is understood to mean, for instance, extreme positions or parts of the path.

To avoid unnecessary energy consumption and to prevent bird habituation to a pattern, the apparatus, according to a preferred embodiment, is provided with a bird detection element for detecting birds in the surroundings of the apparatus, the bird detection element is connected with the control element, and the control element is arranged for executing a program after detection of a number of birds by the bird detection element. With these features, the program is executed only when birds are actually present. The invention further concerns a method, whereby after detection of a number of birds the laser beam executes a program.

Alternatively, or in combination with the above-mentioned feature, the apparatus is provided with a prediction element for predicting an airplane approaching the surroundings of the apparatus, the prediction element is connected with the control element and the control element is arranged for executing a program when the prediction element predicts the approach of an airplane. An airplane is understood to mean any body traveling through the air, such as a helicopter or an unmanned airplane. This feature takes the high speed of airplanes into account, so that the birds will have been scared away in good time before the arrival of the airplane in the area where the apparatus is disposed. This embodiment also concerns a method, whereby after detection of a number of birds the laser beam executes a program.

According to a further preferred embodiment, the apparatus is arranged for generating a laser beam moving fast in a direction, which is perceived by birds as a surface, upon prediction of the approach of an airplane. By generating such a 'surface', the deterrent action against the birds is enhanced, while through a suitable positioning of the 'surface' with respect to the runway, birds are prevented from approaching the runway.

In some situations, for instance in glaring sunlight, the laser beams and the spots on the ground or on fixed structures are poorly perceptible to the birds. To be able to scare the birds effectively in such a condition too, a further embodiment proposes that the apparatus is provided with alternative bird deterrent means for deterring birds in a different manner than with laser light and that the control element is arranged for controlling the alternative bird deterrent means. The presence of glaring sunlight or light coming from a different source can be detected by a light detector.

Although the possibility of activating the alternative bird deterrent means prior to or after the laser light generator is not excluded, it is preferred that the control element is arranged for activating the alternative bird deterrent means simultaneously with the laser light generator.

Furthermore, it is preferred when the control element is arranged for, after executing a program with the laser light generator, executing a presence detection of birds and, in the presence of birds, activating the alternative bird deterrent means. This makes it possible to initially utilize the bird deterrent means working with laser light and, in situations where these have proved not to be effective, to utilize alternative bird deterrent means.

The alternative bird deterrent means comprise, for instance, an apparatus for generating a water jet or means for producing sound.

Figure 2:
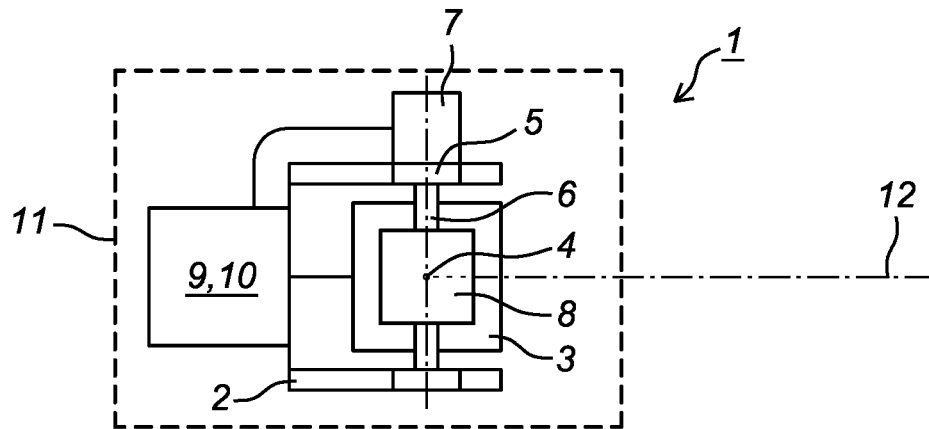
Figure 3:
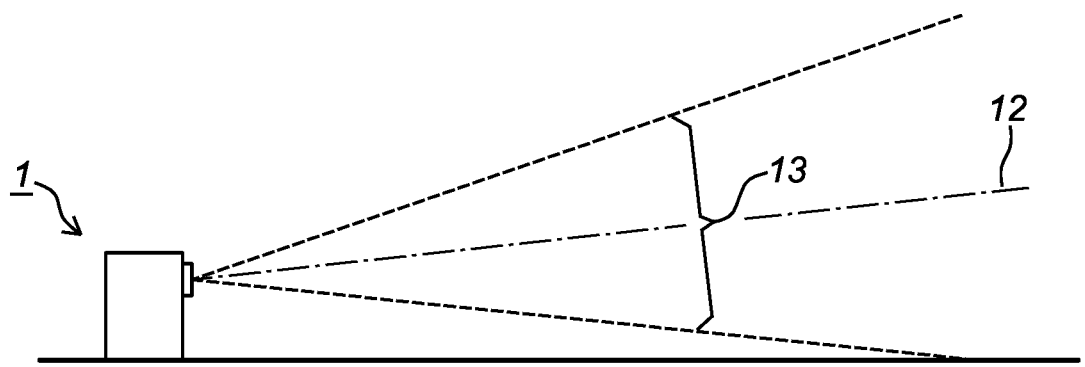
Figure 4:
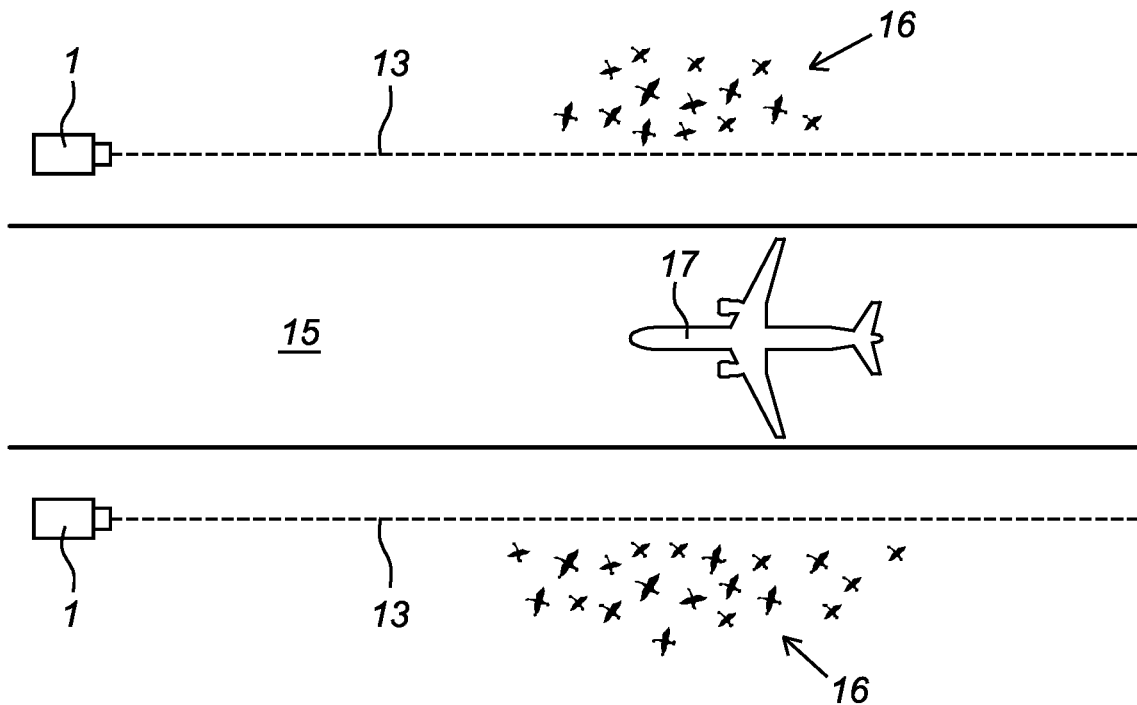
Figure 5:
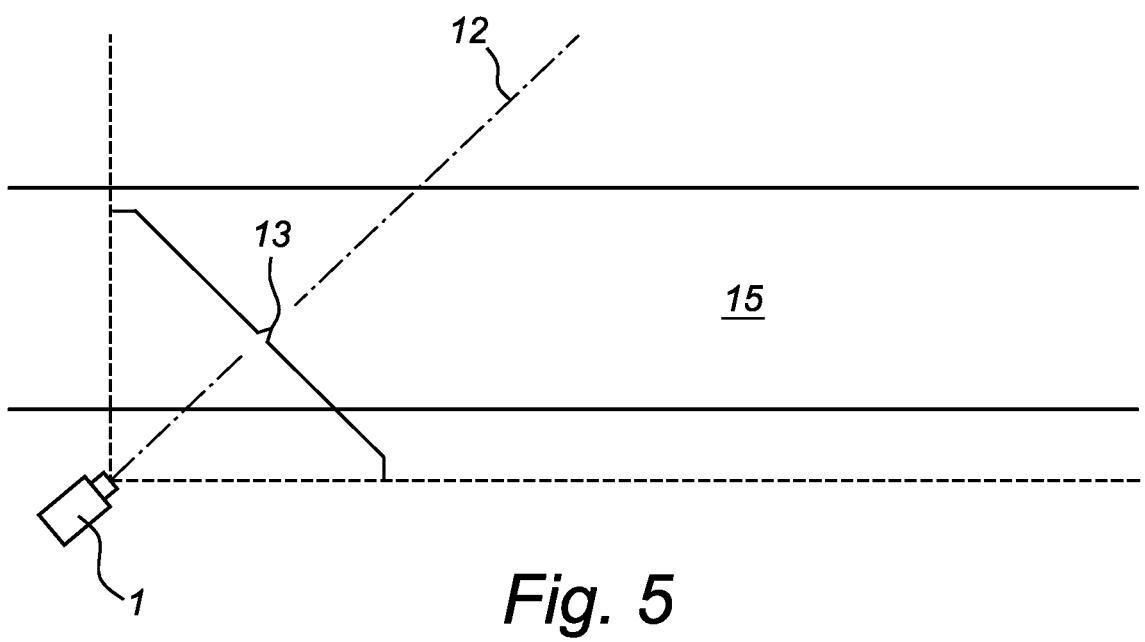
Figure 6:
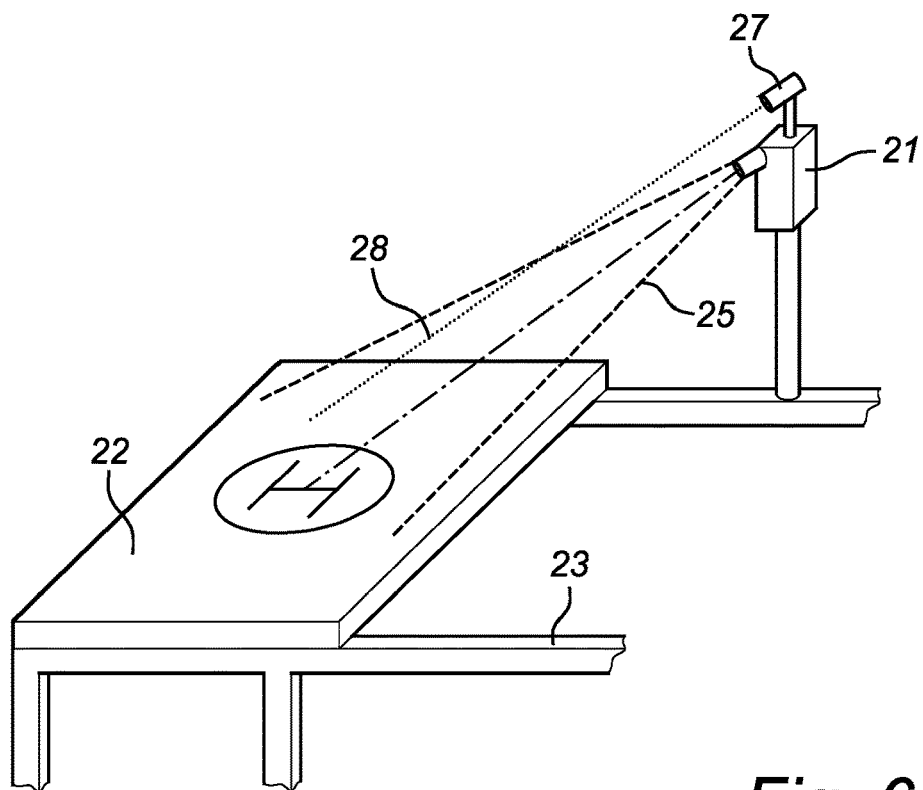

The present invention will now be elucidated on the basis of the accompanying drawings in which the figures represent the following:

FIG. 1: a schematic side view of an apparatus according to the invention;

FIG. 2: a schematic top plan view of the apparatus depicted in FIG. 1;

FIG. 3: a side elevation of an apparatus according to the invention and the laser beam generated thereby;

FIG. 4: a top plan view of a specific configuration according to the invention;

FIG. 5: a top plan view of a variant of the configuration represented in FIG. 4;

FIG. 6: a perspective view of another embodiment; and

Figure 7:
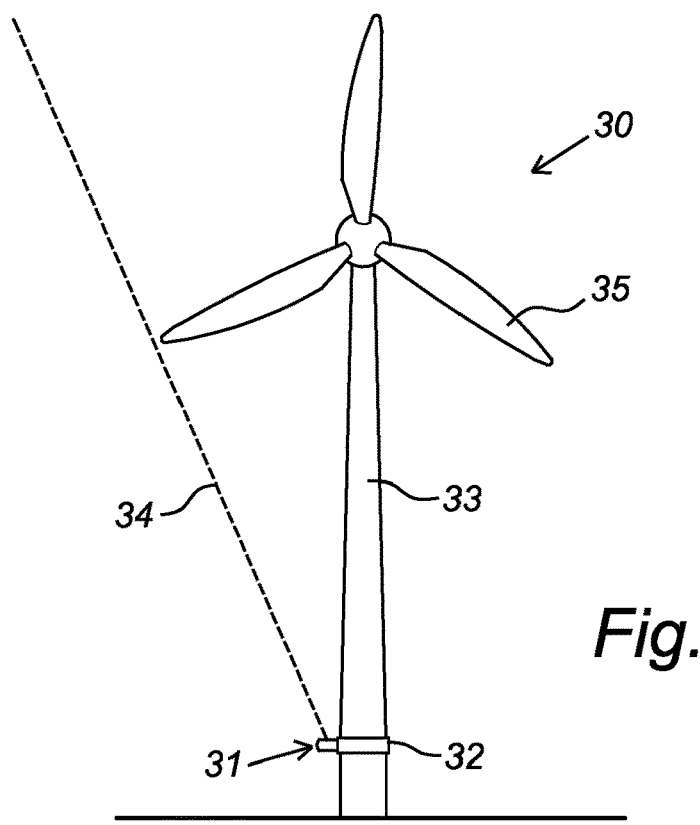

FIG. 7: a side view of a configuration suitable specifically for wind turbines.

The apparatus depicted in FIGS. 1 and 2, designated as a whole with 1, comprises a fixedly disposed frame 2, in which a laser source 3 is mounted, with its optical axis 4 directed upwards. Placed above the laser source 3 and connected with the frame 2 are a pair of bearings 5, in which a shaft 6 is rotatably bearing-mounted. The shaft 6 is drivable for rotation by an electric motor 7. Arranged on the shaft is a mirror 8. By drive of the electric motor 7 the rotation position of the mirror 8 is adjusted to thereby control the amount of deflection of the laser beam 4 exiting from the laser source 3 in a horizontal plane. For the supply of the laser source 3 a supply unit 9 is present, and for the control of the electric motor 7 and the laser source 3 a control unit 10 is in place. The whole is accommodated in a housing 11. The supply unit may be formed by a battery, typically combined with a PV panel, but may also be formed by a connection to a supply network.

Upon activation of the apparatus, by means of the supply unit 9 and the control unit 10 the laser source 3 is switched on so that a laser beam 4 exits from the laser source 3 along the optical axis. This laser beam 4 strikes the mirror 8, which has an oblique position, so that the laser beam 12 reflected by the mirror 8 exits in a horizontal direction. With this, the apparatus is suitable for generating a stationary laser beam, which, as has been described above, exits in horizontal direction and which is perceived by the birds, so that the birds are scared away. The laser beam 12, under the influence of the control unit 10 and the mirror 8, may also exit upwardly inclined or downwardly inclined. In the latter case the laser beam will then hit the ground and cause a light spot on the ground which scares away the birds.

The above concerns a stationary solution; it is also possible, as has already been explained, to utilize a movable laser beam. To this end, in the above embodiment, the electric motor 7 is to drive the mirror such that the exiting laser beam 12 moves in the vertical direction. By the dynamics resulting from this, the birds are deterred more easily. Such a situation is represented in FIG. 3. When the mirror is driven with a high speed, the birds perceive the laser beam as a surface 13. This embodiment requires a fast moving mirror. While to this end use can be made of a fast rotating electric motor, as in the above-described embodiment, it is also possible to utilize for this purpose an electric driving element having the structure of a galvanometer.

FIG. 4 shows a situation in which two apparatuses 1a, 1b like the one shown in FIG. 3 are placed on opposite sides of a runway 15. With these, two laser beams 12 are generated which, as a result of their rapid movement, apparently form a vertical surface. In the situation shown in FIG. 4, it is clear how these surfaces keep the runway 15 clear of birds 16 in order to minimize the danger of an airplane 17 hitting a bird. It is obviously necessary here that prior to generating the radiation pattern represented in FIG. 4 the birds 16 be scared off the runway 15, for instance by having either or both of the laser beams 12 sweep above the runway 15.

Naturally, other configurations are possible; thus, it is possible to dispose the apparatuses 1 in such a manner that the apparent surfaces 13 extend transversely to the runway 15. This prevents birds 16 from moving in the longitudinal direction of the runway to the part where the airplanes 17 land and take off. It is incidentally noted that it is more attractive when only a single apparatus 1 according to the invention is present and the laser beam exiting from the apparatus 1 moves not only in the vertical plane but also in the horizontal plane. Particularly when the movements in the vertical plane are fast and the movements in the horizontal plane slower, a surface is obtained that, to the birds, apparently swerves. This configuration, for that matter, can also be used in other situations.

Furthermore, the above described apparatuses may be coupled with a prediction device for predicting the arrival of an airplane, so that the apparatus is switched on only then. To this end, a link with the installations of the air traffic control can be made. Also, a link with a presence detector for birds can be made in order to generate a laser beam only when birds are present.

Finally, FIG. 6 shows a situation in which an apparatus 21 according to the invention is disposed on a helicopter platform 22, for instance on an oil rig. On a steel construction 23, which is part of an oil rig not further shown, the helicopter platform 22 has been placed, as well as an apparatus 21 according to the invention. This apparatus is arranged for generating a laser beam 25, which is directed towards the helicopter platform 22. The laser beam can then move over the platform 22 in both directions to scare away birds present on the platform. Furthermore, the apparatus according to the invention comprises a water cannon 27 placed on the apparatus 21. The control of the water cannon 27 is then programmed such that the water jet 28 exiting from the water cannon 27 is aimed at the same part of the platform 22 as the laser beam 25 exiting from the apparatus 21. Upon simultaneous operation of the laser beam 25 and the water jet 28, the birds are deterred in two ways at the same time. It is also possible, however, to use the water jet as an alternative to the laser beam, for instance when due to glaring sunlight the laser beam is poorly visible to the birds. Also, it is possible to use the two media alternately.

Also in this embodiment, the laser source or the water cannon may be arranged to be activated only upon detection of birds or in anticipation of the arrival or departure of a helicopter. Finally, as in the initially discussed embodiment, it is possible to aim the water jet or the laser beam at the place where birds have been observed.

The embodiment shown in FIG. 7 is suitable for placement on a wind turbine 30. The apparatus 31 according to the invention is placed on a ring 32, which is arranged rotatably around the tower 33 of the wind turbine 30. The apparatus 31 is movable along the ring 32 by drive means not shown. The apparatus 31 is arranged for radiating a laser beam 34 which extends obliquely upwards at an angle to the tower 33. The angle is then chosen such that the laser beam 34 upon rotation of the apparatus along the ring describes a cone, the cone enveloping the path of the blades 35 of the wind turbine 30.

The invention claimed is:

1. An apparatus for deterring birds from a fixed structure, comprising:
    a frame fixedly disposed on a structure;
    a light generator connected with the frame, including a light source for generating a light beam;
    a supply circuit for supplying the light source;
    driving means connected with the light generator, for having at least a part of the light generator move; and
    a control element for controlling the light source and the drivable part of the light generator, wherein the driving means are arranged for causing a movement to be executed of at least a drivable part of the light generator wherein the control element is further arranged in that the light beam is caused to move by the control element that the moving beam is perceived as a surface that keeps the birds away from the fixed structure.

2. The apparatus according to claim 1, wherein the light generator comprises a deflection device connected after the light source and provided with mirrors, that the light source is fixedly connected with the frame and that the driving means are arranged for driving the deflection device at a high frequency.

3. The apparatus according to claim 1, wherein the light source is arranged for generating light having a wavelength of between 300 nm and 400 nm.

4. The apparatus according to claim 1, wherein the control element is arranged for causing the light beam to move in a vertical plane with fast movements in a horizontal plane with slower movements, so that an apparent surface is obtained that swerves.

5. The apparatus according to claim 1, wherein the apparatus is arranged to be placed on a moving structure, such as a ship, and that the apparatus is provided with means for limiting the angle of elevation of the exiting light beam.

6. The apparatus according to claim 1, wherein the apparatus is arranged for causing the beam to move jerkily.

7. The apparatus according to claim 1, wherein the apparatus is arranged for causing a figure to be described which forms the envelope of a structure.

8. The apparatus according to claim 1, wherein the control element is arranged for repetitively causing a program to be executed by the beam.

9. The apparatus according to claim 8, wherein the control element is arranged for each time executing the same program.

10. The apparatus according to claim 8, wherein the control element is arranged for each time executing a different program.

11. The apparatus according to claim 8, wherein the control element is arranged for executing a program at predetermined points of time.

12. The apparatus according to claim 8, wherein the control element is provided with input means and that the input means are arranged for inputting properties of the path to be described by the beam.

13. The apparatus according to claim 1, wherein the apparatus is provided with a bird detection element for detecting birds in the surroundings of the apparatus, that the bird detection element is connected with the control element and that the control element is arranged for executing a program after detection of a number of birds by the bird detection element.

14. The apparatus according to claim 1, wherein the apparatus is provided with a detection element for detecting approaching subjects to the surroundings of the apparatus, that the detection element is connected with the control element and that the control element is arranged for executing a program when the detection element detects the approach of a subject.

15. A method for deterring birds from a fixed structure, which comprises generating in a fixedly disposed apparatus a bird deterring light beam, wherein the light beam performs a repetitive movement wherein the light beam is caused to move such that the moving beam is perceived as a surface that keeps the birds away from the fixed structure.

\* \* \* \* \*